Figure 1:
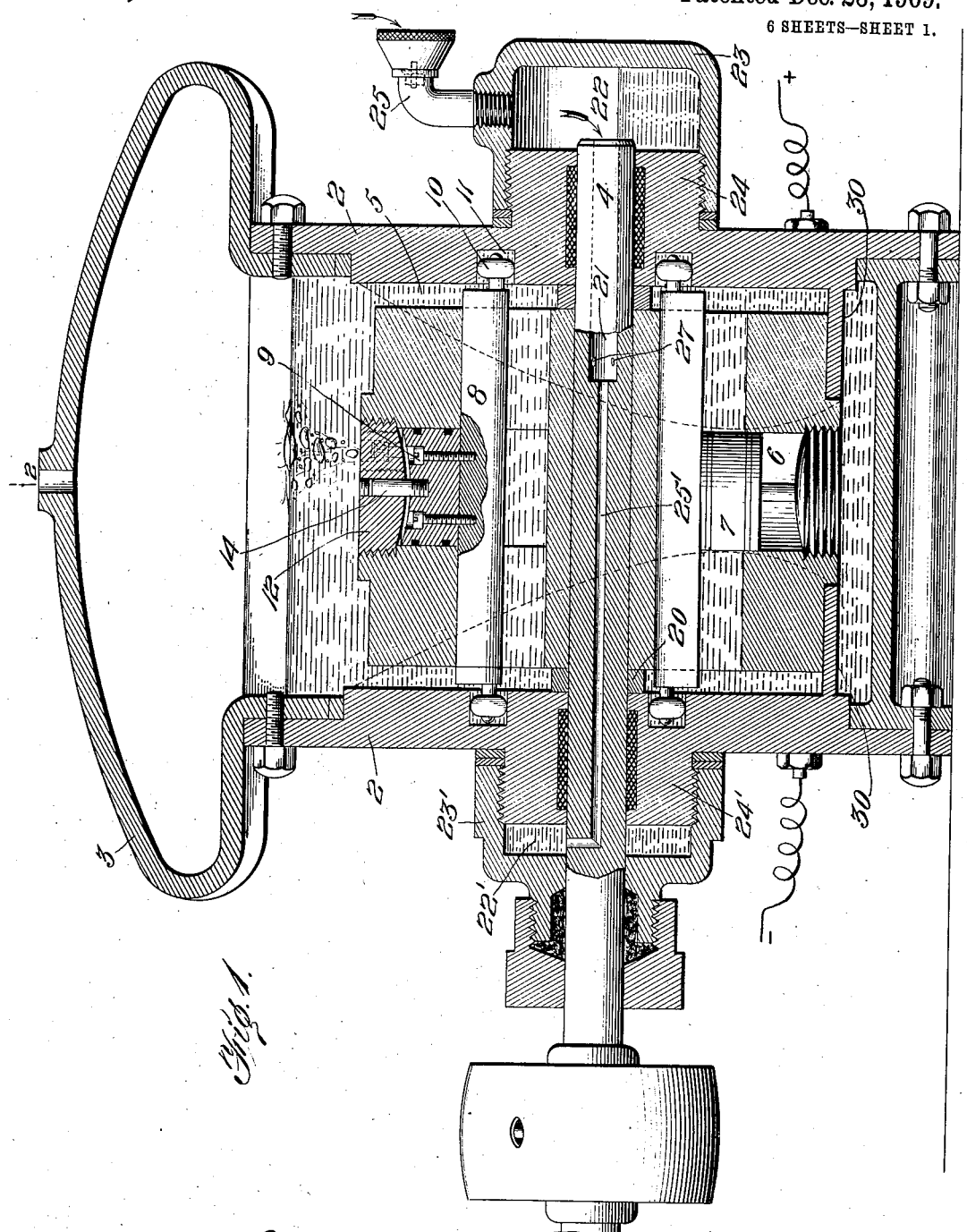

L. H. ROGERS.
ROTARY AIR OR GAS PUMP.
APPLICATION FILED MAR. 30, 1906.

944,913.

Patented Dec. 28, 1909.

6 SHEETS—SHEET 1.

Witnesses:
Gustave R. Thompson.
Frederick A. Holton.

Inventor.
Lebbeus H. Rogers,
By his Attorneys:
Mauro, Cameron, Lewis & Massie

L. H. ROGERS.
ROTARY AIR OR GAS PUMP.
APPLICATION FILED MAR. 30, 1906.

944,913.

Patented Dec. 28, 1909.
6 SHEETS—SHEET 2.

L. H. ROGERS.
ROTARY AIR OR GAS PUMP.
APPLICATION FILED MAR. 30, 1906.

944,913.

Patented Dec. 28, 1909.
6 SHEETS—SHEET 3.

Witnesses:
Gustave R. Thompson.
Frederick A. Holton.

Inventor:
Lebbeus H. Rogers,
By his Attorneys:
Mauro, Cameron, Lewis & Massie

L. H. ROGERS.
ROTARY AIR OR GAS PUMP.
APPLICATION FILED MAR. 30, 1906.

944,913.

Patented Dec. 28, 1909.

6 SHEETS—SHEET 4.

Witnesses:
Gustave R. Thompson.
Frederick A. Holton.

Inventor:
Lebbeus H. Rogers,
By his Attorneys:
Mauro, Cameron, Lewis & Massie.

L. H. ROGERS.
ROTARY AIR OR GAS PUMP.
APPLICATION FILED MAR. 30, 1906.
944,913.
Patented Dec. 28, 1909.
6 SHEETS—SHEET 5.
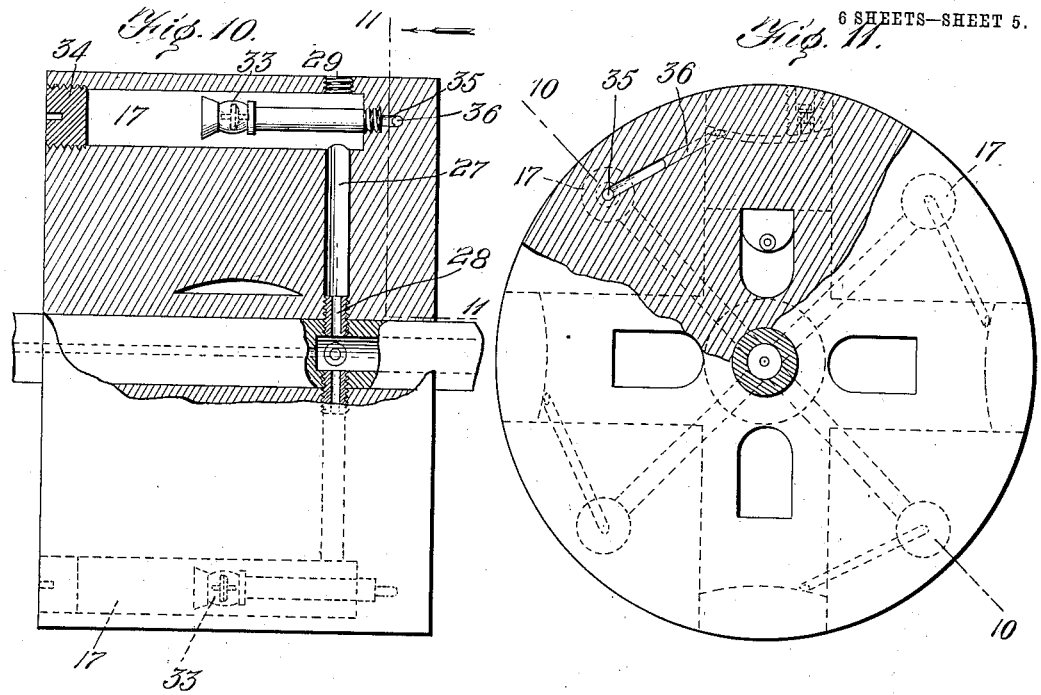
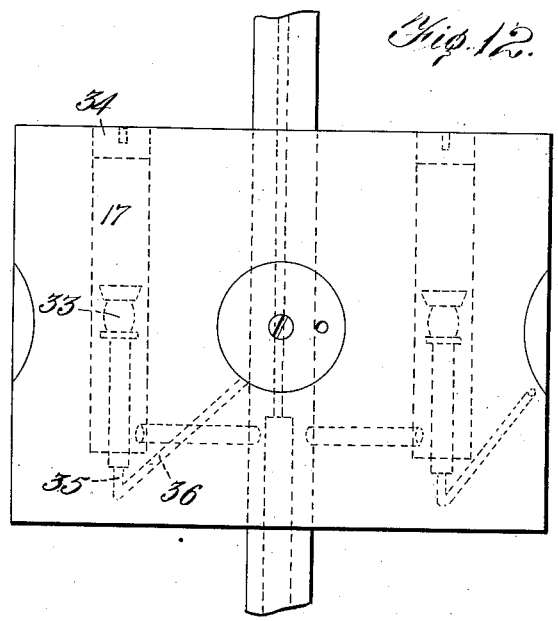

L. H. ROGERS.
ROTARY AIR OR GAS PUMP.
APPLICATION FILED MAR. 30, 1906.

944,913.

Patented Dec. 28, 1909.
6 SHEETS—SHEET 6.

UNITED STATES PATENT OFFICE.

LEBBEUS H. ROGERS, OF NEW YORK, N. Y.

ROTARY AIR OR GAS PUMP.

944,913.  Specification of Letters Patent.  Patented Dec. 28, 1909.

Application filed March 30, 1906. Serial No. 309,001.

*To all whom it may concern:*

Be it known that I, LEBBEUS H. ROGERS, of New York, N. Y., have invented a new and useful Improvement in Rotary Air or Gas Pumps, which invention is fully set forth in the following specification.

This invention relates to air and gas pumps and more particularly to pumps of the rotary type.

While the invention is specially adapted to compression of gases, yet it may be used as a simple pump, or as a vacuum pump.

In prior applications I have described air and gas pumps of the rotary type in which cam-operated pistons are made to reciprocate in radially disposed piston channels within a drum revolving within a casing against the inner walls of which the periphery of the drum or its ends bears snugly. The pumps of the character here referred to have their cut-offs in the bearing surfaces of the drum and casing requiring great nicety of fit of the parts, particularly of the drum within the casing. With such close fitting there is necessarily a large amount of friction, and further, pumps of the kind referred to, in which radially moving pistons take in air during one part of the revolution of the drum and expel the same against reservoir pressure during the remainder of the revolution, exert on their shaft-bearings a greater pressure during the compression stroke than when the pistons are idle or are taking in air. In my application Sr. No. 231,800, filed November 7, 1904, I show and describe means for applying an equalizing oil pressure to the shafts of the piston-drum within the shaft-bearings to counteract such unequal pressure and to thereby reduce friction at the bearings, and such means are not herein claimed.

The object of the present invention is to eliminate to a large extent the friction incident to the previous constructions; to provide improved means for balancing or offsetting the pressure on the shaft-bearings; to secure more uniform action of pistons and to improve the construction of the pump in general.

With these objects in view the invention consists in a closed casing within which a drum having a hollow shaft is mounted to revolve in bearings in the casing, both the periphery of the drum and the end walls of the same being out of frictional contact with the walls of the casing. The piston-carrying drum which is preferably made of a single casting is provided with a plurality of radially disposed piston-channels communicating with the atmosphere through the hollow drum shaft by way of valve-controlled passages preferably through air-receiving chambers within the body of the drum. The air-chambers in the drum may each communicate directly with the hollow shaft or may communicate with each other and then have a common connection with said shaft through which the air or gas to be compressed or exhausted is taken. Within the piston channels are a plurality of pistons mounted on piston-bars having cam-rollers running in cam-grooves sunk in the end walls of the casing which impart a reciprocating movement to each piston as the drum revolves. Air is taken in through the hollow drum shaft from the outside of the casing, during the in-stroke of the pistons, passing through the air-chambers to the piston-channels past pop or check valves. On the compression stroke the air is expelled from the piston-channels through valve-controlled outlets. These valved outlets for the compressed gases may be located in the pistons or in the walls of the piston-channels, and open into the space of the casing through any part of the drum surface. The backs of the pistons are at all times subjected to fluid pressure within the casing or to reservoir pressure, the space behind the pistons being in open communication with the interior of the casing, through centrally disposed openings near the drum-shaft and preferably filled with some liquid such as oil. A portion of each piston-face on its air pressure side is preferably subjected to the atmospheric pressure in the air-chamber during the complete cycle of its operations, thereby securing contact of the cam rollers against the outer cam track and avoiding clattering noises in operating the pump, as set forth in my application Sr. No. 299,968, filed February 7, 1906.

During the operation of the pump the pistons during their compression stroke exert a force which is transmitted to the drum shaft acting to press the ends of the shaft against its bearings. The direction of this force or thrust is radially outward and on the pressure side of the drum, increasing as the compression in the piston-channels increases, and resulting in uneven wear of the bearings and increased friction. To offset or balance this pressure of thrust of the shaft on its bearings, I provide one or more pressure shields which may assume various forms depending on the character of the pressure of the pistons as indicated by a pressure card, and which are supported by and extend from the inner walls of the casing and rest over and in contact with definite areas on the surface of the piston drum, to shield such areas from fluid pressure within the casing. The areas of these shields depend mainly on the area of the working piston surfaces, and are so positioned relatively to the drum circumference that the fluid pressure within the casing will off-set or balance the force of the compression stroke of the pistons which is exerted on the shaft bearings.

The invention further resides in providing the pump with means for taking care of the oil which incidentally escapes past the bearings of the piston drum and to return such portions of oil back to the body of oil within the casing against the pressure therein.

The invention further resides in providing an improved cam-track which enables the pistons to reciprocate in their channels with greater uniformity of movement, giving to the pump a smoother action.

My invention further consists and resides in the construction and combination of co-operating elements hereinafter to be more fully described and then recited in the claims which are hereto annexed.

For the purpose of assisting in the description of the invention reference is had to the accompanying drawings, which illustrate certain mechanical expressions of the inventive idea involved, in which—

Figure 2:
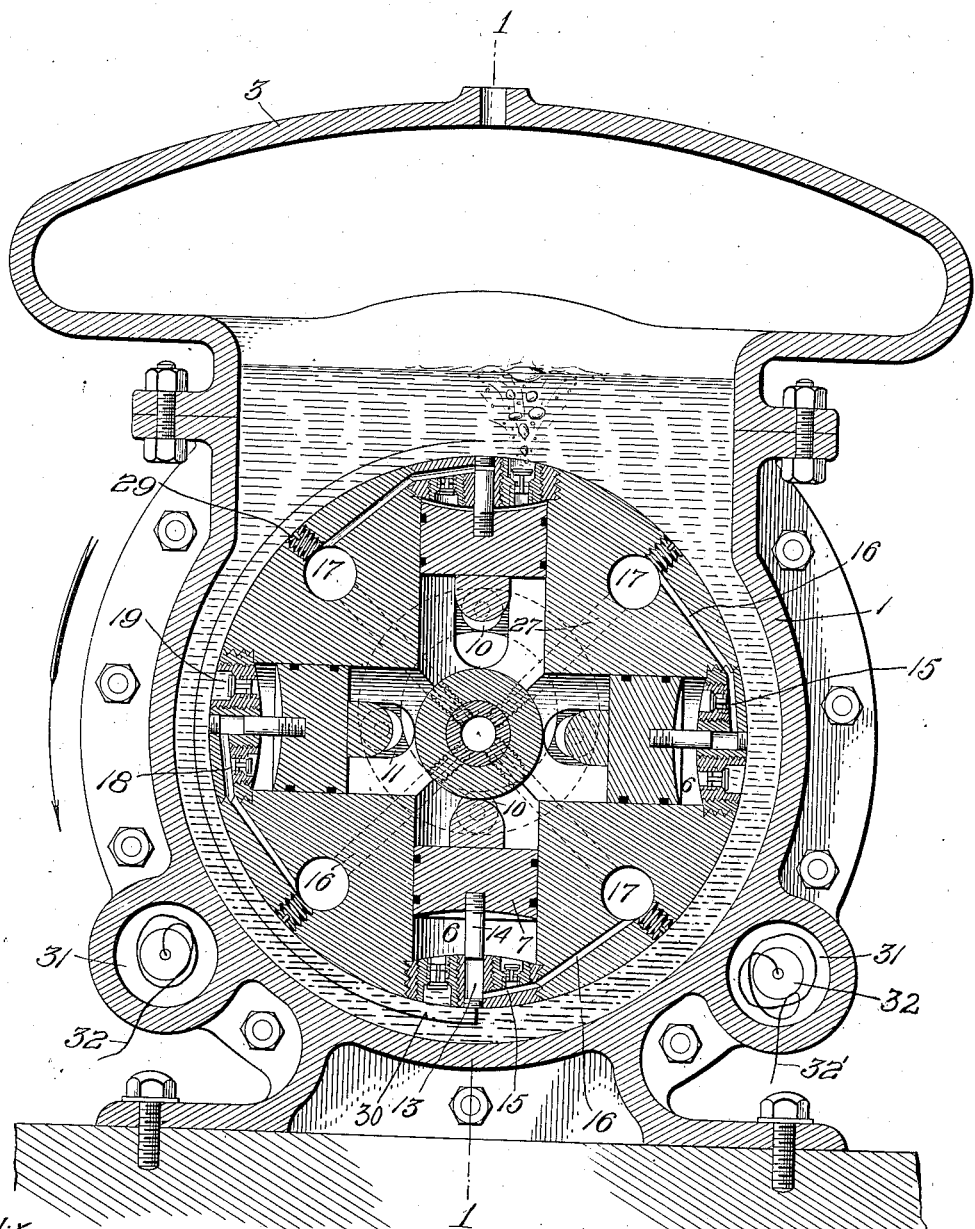
Figure 3:
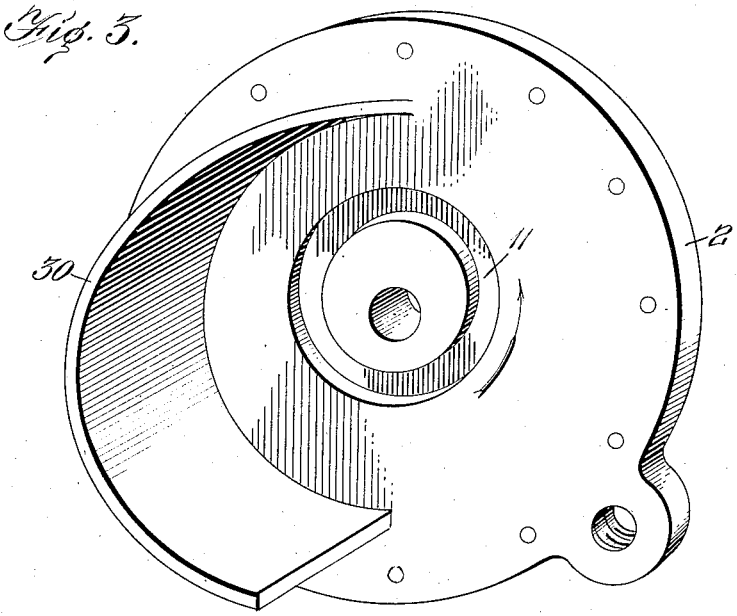
Figure 4:
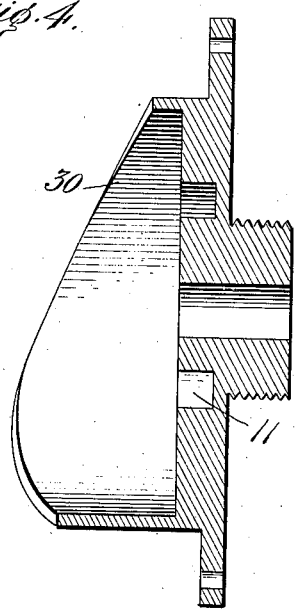
Figure 5:
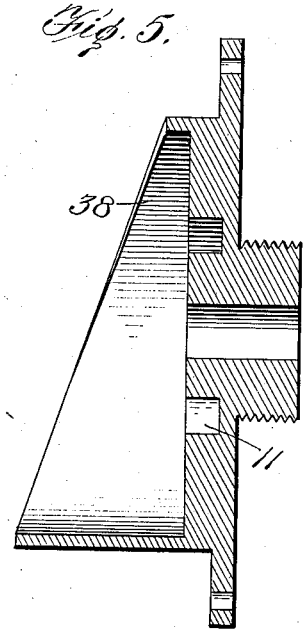
Figure 6:
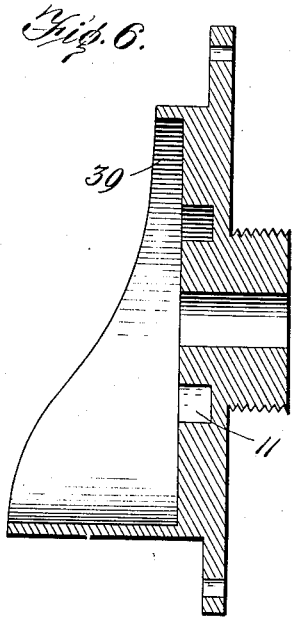
Figure 7:
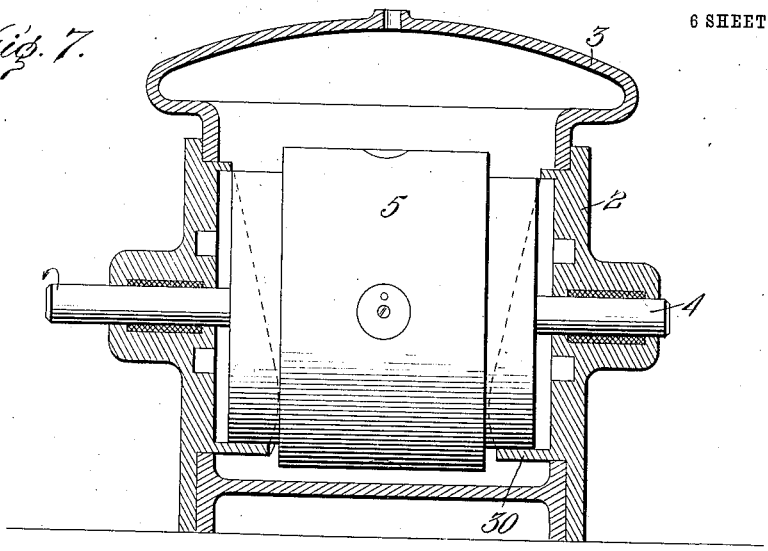
Figure 8:
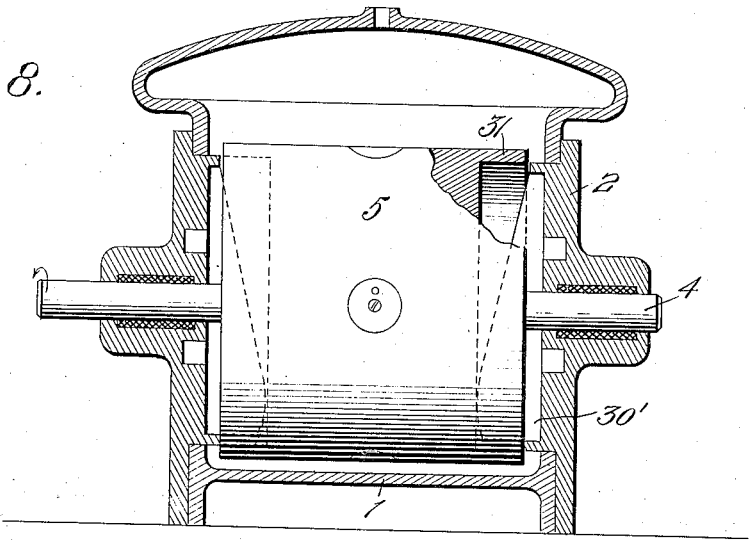
Figure 9:
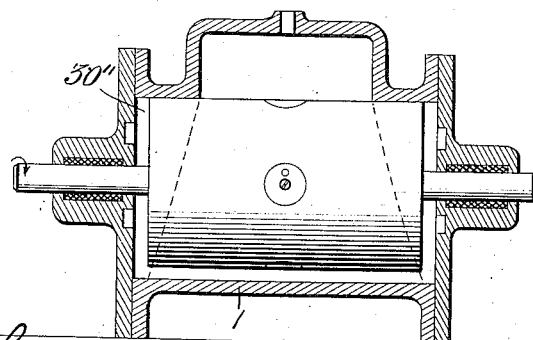
Figure 13:
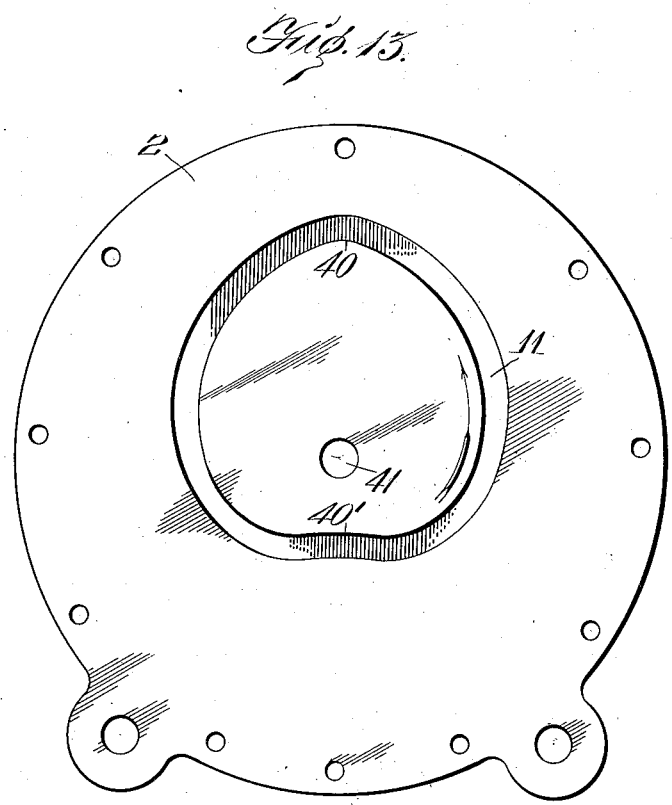

Figure 1 is a central longitudinal section of the air and gas pump on line 1—1, Fig. 2, and Fig. 2 is a central cross-section on line 2—2, Fig. 1. Fig. 3 is a view in elevation showing one form of pressure-shield. Figs. 4, 5 and 6 show in part elevation and part section other forms of shield embodying the inventive idea. Figs. 7, 8 and 9, illustrate in part elevation and part section various applications of the pressure-shield to the piston drum. Fig. 10 is a view showing another form of piston drum, the broken section being taken on line 10—10, Fig. 11; Fig. 11 is in part an end elevation of the drum shown in Fig. 10 and in part a section taken on line 11—11, Fig. 10. Fig. 12 is a diagrammatic view of the drum of Figs. 10 and 11, showing the arrangement of air-channels, and Fig. 13 shows in elevation one of the end walls of the pump casing provided with my improved form of cam track.

Referring to Figs. 1 and 2 the pump casing consists of a cylindrical body portion 1, having end walls 2, 2, one of which may be integral with said body or both may be separable therefrom, and a dome or reservoir 3, for receiving and condensing oil spray or froth which is apt to form when air is expelled through oil within the casing. Mounted on a hollow shaft 4, having bearings in the end walls 2, 2, of the casing is a piston-carrying drum 5. This drum is preferably made in a single casting and is provided with a plurality of piston channels 6, preferably cylindrical in shape, in which pistons 7 are caused to reciprocate by means of piston-carrying bars 8, secured thereto, as by screws 9, said bars extending through longitudinal central spaces in the drum casting and being provided at their ends with trunnions carrying rollers 10, running in cam-grooves or tracks 11 formed in the end walls 2, 2, of the casing. These cam-tracks may assume circular or other forms, as will hereafter be more fully described. Those shown in Figs. 1 and 2 referred to are circular. The outer ends of piston-channels 6 are closed by screw-plugs 12, having a central channel 13, Fig. 2, in which reciprocates a plunger 14 fast in piston 7. The plunger channels are in communication at all times with the atmosphere through passages 15, 16 and air-chambers 17, thereby exposing a portion of the working piston-face of each piston to atmospheric-pressure during a complete revolution of the drum. The construction just referred to forms a part of the subject-matter of my prior application Sr. No. 299,968, filed February 7, 1906, and is not herein specifically claimed.

In the present form of the invention the piston-drum 5 is closed at its ends except near the central portions, where openings are provided for play of the piston-bars 8. The ends of the drum are held away from the cam-faces formed by the end walls of the casing to avoid frictional bearing against the cam-faces. This is preferably effected by means of rings or washers 20 interposed between the drum and cam-faces on the shaft 4. On the pressure-stroke of the piston the air is forced out of the piston-channels 6 through pop valves 19. As shown in Figs. 1 and 2 these valves are located in the plugs 12 closing the piston channels, but may be located in the piston itself, discharging into the oil-spaces in the axis of the drum, or they may be located in any other portion of the drum.

For the purpose of admitting air to the air-chambers 17 which are disposed intermediate the piston-channels 6 and extend longitudinally of the drum, an air-duct 21 is provided in the shaft 4 of the drum. This duct communicates with the atmosphere by way of an air-inlet chamber 22, formed by a cap 23 taking over a screw-threaded hub or bearing 24. In the wall of this chamber is located a valved inlet-pipe 25, the valve therein opening inward, thereby further preventing escape of compressed air by back-pressure within the drum. The air-duct 21 preferably extends only part way along the drum-shaft, as shown in Fig. 1, where it terminates in a small oil-passage 25′, the purpose of which is hereafter fully described. Branching from air-duct 21 are radial air-ducts 27, Figs. 2 and 10 which communicate with air-chambers 17, and thence to the piston-channels 6 and plunger channels 13 by way of passages 16, 15 and inwardly-opening pop-valves 18 in the plugs 12. The chambers 17 may have a single air-supply passage 27, in which case the several air-chambers 17 will communicate with each other through the walls of the drum, as in my application Sr. No. 299,968, above referred to. The air-channels 27 in the drum-casting, it will be noted, register with similar openings in the drum shaft 4. In order that there may be no leak at such junction and in order to maintain a proper registry of these channels 27 with the openings in the shaft, a screw-threaded bushing 28, Fig. 10, is introduced through channel 27 and inserted into threaded portions of the drum casting and wall of the shaft 4. The outer ends of channels 27 open through the periphery of the drum and are closed by means of screw-plugs 29.

By reason of the construction above described whereby the air is admitted through the drum-shaft the ends of the drum are enabled to move out of contact with any bearing surfaces and thereby greatly avoiding frictional resistances and simplifying the construction of the pump.

A further feature of the invention resides in the manner of balancing the pressures exerted on the shaft bearings during the compression stroke of the pistons. As illustrated in Fig. 2 the drum carrying the pistons rotates contra-clockwise, taking in air into the piston-channels 6 on the left-hand side of the drum from the time the upper piston is moving from its top initial position till it has arrived at a point 180° therefrom. During the next half revolution the same pistons are compressing air against reservoir pressure or pressure within the casing and finally expelling the same through the oil in the casing when the pressure within the piston channels exceeds that of the reservoir pressure. The pressure exerted on the gases within the piston-channels is transmitted to the closures 12 and to the drum-shaft 4 against the shaft-bearings 24 on the compression side of the drum, thereby causing friction and unequal wear of the bearings. To balance or off-set this thrust or pressure on the bearings I provide pressure-shields 30, Figs. 1 and 3, which extend from the end walls of the casing inward over the drum and conform to the cylindrical outlines of the drum with which it contacts.

The contour of the shield is more or less rectangular and the two, one at each end of the drum, have a total area approximately that of the combined area of the faces of the working pistons. The shields in Figs. 1 and 2 are so positioned about the drum relatively to the working-pistons therein that they shield that portion of the periphery of the drum from external fluid pressure or reservoir pressure opposite that of the compression side of the drum. The shielding surface is also distributed so that as the compression within the piston-channels increases the protecting surface of the shields increases, thereby permitting the fluid-pressure within the casing of the pump to progressively balance or off-set the pressure on the shaft-bearings.

Although I have here described by way of illustration a fixed pressure-shield, rectangular in shape and positioned to act against the peripheral surface of the drum, it is obvious that the shields may be made adjustable or take on other configurations to follow the pressure diagrams or cards characteristic of the pressure-stroke of the piston, and may take other positions relative to the pistons, and that the shields may guard inner surfaces of the piston drum, as shown in Fig. 8. In this form of construction the shields are located on the pressure side of the drum in order to off-set the pressure on the bearings. The pressure-drum is provided with a rim 31 extending beyond the ends of the drum and taking over the shield 30′ extending from the end walls 2, 2 of the pump casing. The drum 5 rotates in the direction of the arrow and the compression takes place on the shield side. The off-setting pressure is exerted upward and toward the atmosphere side of the drum on the inner rim 31.

In Fig. 9 another expression of the inventive idea is shown, in which the walls of cylindrical casing 1 fit against a portion of the piston-drum constituting shields 30″. The dome for oil in such case is preferably formed integral with the casing of the pump. The preferred arrangement, however, for the shields is that shown in Figs. 1, 2 and 7, in which the pressure shields rest in ledges of the drum substantially flush with the outer surface of the same, the form of the shields being more or less rectangular and in shape of wings extending from the end walls of the casing and about half-way around the circumference, as shown in Figs. 1 and 7. It will be obvious however, that the contour of the shields may be varied and take in other form to meet varied requirements in characteristics of the pistons, as indicated by shields 38, 39, Figs. 5 and 6.

The operation of the shields will be readily understood by reference to Figs. 1 and 2. The external surface of the drum, unless otherwise protected, is subjected to equal pressures over its entire outer surface. This balance of pressure may, however, be disturbed by shielding the surface of the drum from such pressure by the use of pressure-shields above described. A pressure can thus be exerted on the surface of the drum opposite the shields, which is utilized to off-set that of the shaft against its bearings and the point of application of this balancing pressure is made effective at any point by proper location of the shields.

A further feature of my invention resides in the means for taking care of the leakage of oil at the bearings or ends of the shaft and returning the oil to the interior of the casing against reservoir pressure. Referring to Figs. 1 and 2, the shaft 4 is provided with an oil duct 25' opening at one end into the air-duct 21 and at its opposite end into a chamber 22' formed by a cap 23' taking over the hub or bearing 24'. Shaft 4 passes through the end wall of cap 23' and makes a snug fit therein by means of a packing-box of any well-known type.

From the above description it will be clear that oil finding its way from the interior of the casing into chambers 22, 22' will be drawn into ducts 21 and 25' on the suction stroke of the pistons aided by centrifugal force, and will pass by way of passages 27, where it will be acted on partly by suction and partly by centrifugal force, and will enter air-chambers 17, there to be further acted on by centrifugal force and impelled against the outer walls of said chambers. It is to be noted that these chambers are preferably located with their outer walls nearer the center of the drum than are the passages 15 in the piston-channels 12. This position of the chambers relative to the passages 15 coupled with the fact that the drum rotates counter-clock-wise combine to impel the oil along the channels 16 toward the piston-channels 6. The channels 16 are shown as opening tangentially to the outer wall of chambers 17, yet they may open at any other point, if desired, and conduct the oil to channel 15, where it is delivered with the in-going air past valves 18 into the piston-spaces 6. On the compression stroke of the pistons the escaped oil is expelled with the compressed air against reservoir pressure into the casing of the pump past pop-valves 19.

In cold weather, when oil is used within the pump and is permitted to remain for extended periods of time at low temperatures, it sometimes thickens or congeals and impedes starting of the pump. To overcome this difficulty I provide in the walls of the casing, preferably at the lower portions thereof, one or more heating chambers 31. Within these chambers I place heating means such as heating coils 32, preferably inclosed in a sealed tube which may be readily inserted within the chambers and having terminals 32 for connection with a source of current. The heating wires can be inclosed in sealed tubes and placed within the cylinder or within the drum itself.

In Fig. 13 I have illustrated a cam-track which is capable of giving to the pistons a rectilinear movement in their channels, and such that these movements shall be uniform both during the compression stroke and air intake stroke. To secure this result the track is composed of two separate tracks meeting in a line 40, 40' to form a closed curve. These two branches follow the line of a double spiral along which the trunnions of the pistons advance and give to the pistons a uniform motion along the piston channels as the drum uniformly rotates about its axis. The movement imparted to the pistons by this cam track is more uniform than in the case of the circular track and possesses for certain kinds of work advantages over the circular form.

The operation of the device as thus far described will be readily understood from the above description. The several parts of the pump having been assembled and power applied to the shaft 4 in the direction indicated by the arrow, pistons 7 on the left-hand side of the drum, Fig. 2, will move inward and cause air or gas to enter air-duct 21 of shaft 4 through valved pipe 25 and chamber 22. This air will then pass by way of channels 27, air-chambers 17, ducts 16, 15, past pop-valves 18 to the piston-channels 6. Air will also enter plunger channels 13 which are at all times subject to the pressure of the air in chambers 17. As the pistons 7 enter on their compression stroke pop-valves 18 close and the air becomes compressed in piston-channels 6 in the right-hand side of the drum. When this pressure slightly exceeds the pressure within the space of the casing the pop-valves 19 open and the air is forced outward to add its pressure to that in the reservoir. During this compression the pistons, as previously explained, exert through the shaft a thrust on the bearings which in the illustration, Fig. 2, is upward and to the right. To off-set this pressure and to graduate the balancing pressure to the increasing pressure of the pistons the shield 30 protects a gradually increasing area over the drum, thereby enabling the reservoir pressure on the upper right-hand portion of the drum to off-set the opposing thrust of the shaft in its bearings.

Any oil which escapes past the bearings is caught in chambers 22, 22', and is drawn into the interior of the shaft by the inward movement of the pistons, and after once entering the radial passages is aided by centrifugal force to move outward into chambers 17 and into the piston channels 6, as previously explained. From the piston-channels the escaped oil is forced by the outgoing pistons into the body of oil against reservoir pressure. In case the oil should become viscous the terminals 32' of the heater 32 may be connected with a source of heating current. The heat resulting from the running of the compressor is sufficient to keep the oil in fluid condition, and it is only during periods of rest in the coldest weather that supplemental heating is necessary.

In Figs. 10, 11 and 12 is illustrated another arrangement of the air intake valves and air-channels suitable for use when all the air is delivered directly to the piston-channels and the plungers 14 are omitted. Within the air-chamber 17 is placed a pop-valve 33 which is readily introduced into the chamber by removal of plug 34, and is secured in the end of the chamber by means of a suitable threaded connection. The casing of valve 33 communicates through ducts 34, 35 and 36 directly to the piston-space, Fig. 11. The operation of this form of the device will be readily understood from what precedes.

In order to reduce the unequal wear of the cam path at different portions of the same, I may vary the form of the path from that illustrated in the drawings as by shortening the path on the compression side of the drum and lengthening the path on the atmosphere side, whereby the revolutions of the bushings may be equalized in passing over different portions of the same.

What is claimed is:

1. In a rotary air or gas pump, the combination of a casing, a revoluble shaft having bearings in the walls of said casing, a piston carrying drum mounted on said shaft and a pressure shield over a portion of the drum surface for relieving the fluid pressure in the casing on said surface, and balancing the fluid pressure within the casing against the thrust of the shaft on its bearings.

2. In a rotary air or gas pump, the combination of a casing, a piston carrying drum in said casing, a revoluble shaft for said drum and a pressure shield over a portion of the drum surface for relieving the fluid pressure in the casing on said surface and balancing said pressure against the thrust of the said shaft.

3. In a rotary air or gas pump, the combination of a casing, a drum in said casing having counter-sunk ends, pistons in said drum, a revoluble shaft on which the drum is mounted and a shield for relieving the fluid pressure in the casing on a portion of said drum and balancing said pressure against the thrust of the said shaft.

4. In a rotary air or gas pump, the combination of a casing, a drum therein having piston channels and pistons therein, a shaft revolubly supporting said drum out of contact with the walls of said casing, and a pressure shield over a portion of the drum surface for relieving the fluid pressure within the casing on said surface and balancing said pressure against the thrust of said shaft.

5. In an air or gas pump, the combination of a casing, a revoluble drum in the same out of contact with the casing having piston channels and pistons therein, shaft bearings in opposite walls of said casing, a revoluble shaft provided with an air supply duct and having its ends supported in said bearings and fast to said drum, valve-controlled passages connecting said piston channels with said air duct and with the interior of said casing.

6. In an air or gas pump, the combination of a casing, a drum in the same having piston channels and pistons therein, and having air chambers communicating with said channels through valve controlled passages, a shaft revolubly supporting said drum out of contact with the walls of the casing and provided with an air supply duct in communication with said air chambers and valve controlled outlets for said piston channels.

7. In an air or gas pump, the combination of a casing, a drum therein having piston channels and pistons in the same and provided with one or more radially disposed air passages in communication with said piston channels, a shaft revolubly supporting said drum out of contact with the walls of the casing and provided with an air supply duct, said duct having side openings registering with said radial passages and bushings in said passages entering said shaft openings.

8. In an air or gas pump, the combination of a casing, a drum therein having piston channels and pistons therein, a shaft revolubly supporting said drum out of contact with the walls of said casing and provided with an air supply duct in communication with said piston channels, and a semicylindrical pressure shield varying in width from end to end, having its axis coincident with that of the drum, said shield being located over a portion of the drum area opposite the compression side of the drum.

9. In an air or gas pump, the combination of a casing, a drum therein having piston channels and pistons therein, removable plugs closing said channels and provided with two valve-controlled passages, one passage constituting an air inlet and the other a compressed air outlet, air chambers in said drum communicating with said piston channels through said air inlet valves, a shaft revolubly supporting said drum out of contact with the walls of said casing and provided with an air supply duct communicating with said chambers.

10. In an air or gas pump, the combination of a casing, a drum therein having piston channels and pistons in the same, removable plugs closing said channels and provided with plunger channels and piston actuated plungers therein, said plugs also being provided with two valve-controlled passages, one passage constituting an air inlet to the piston channel and the other a compressed air outlet for the same, air chambers in the drum having communication with the piston channels through said air inlet valve and in open communication with said plunger channels, a shaft revolubly supporting said drum and having an air supply duct in communication with said air chambers.

11. In an air or gas pump, the combination of a casing, a drum therein having piston channels and pistons in the same; a shaft for revolubly supporting said drum, having bearings in the walls of the casing, and provided with a duct extending to the outside of the casing through both bearings, caps over the ends of the bearings constituting chambers communicating with said duct and serving to trap oil escaping through the bearings and passages in the drum leading from said duct to said piston channels whereby escaping oil may be returned to the interior of the casing.

12. In an air or gas pump, the combination of a casing, a drum therein, a shaft revolubly supporting said drum, having bearings in the walls of the casing and means for returning oil escaping at the bearings to the interior of the casing through said drum.

13. In an air or gas pump, the combination of a casing, a drum therein having piston channels and pistons in the same, said drum having air chambers and channels tangential to the outer walls of said chambers and communicating with said piston channels, a shaft revolubly supporting said drum and provided with a duct extending longitudinally of the shaft and to the exterior of the casing and communicating with said air chambers, and oil traps receiving escaping oil at the bearings and opening into said duct.

14. In an air or gas pump, the combination of a casing, a piston carrying drum mounted to rotate in a bath of oil in said casing, the latter being provided in its walls with a heating chamber and means in the chamber for heating the same, said chamber being located near the bottom of the casing.

In testimony whereof I have signed this specification in the presence of two subscribing witnesses.

LEBBEUS H. ROGERS.

Witnesses:
 HIRAM D. ROGERS,
 A. P. ESPIE.